(12) United States Patent
Haußmann et al.

(10) Patent No.: US 11,189,847 B2
(45) Date of Patent: Nov. 30, 2021

(54) BIPOLAR PLATE WITH IMPROVED FLOW DISTRIBUTION FOR A FUEL CELL

(71) Applicant: Schaeffler Technologies AG & Co. KG, Herzogenaurach (DE)

(72) Inventors: Jan Haußmann, Eggenstein-Leopoldshafen (DE); Hanna Östreicher, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 161 days.

(21) Appl. No.: 16/472,927

(22) PCT Filed: Dec. 20, 2017

(86) PCT No.: PCT/DE2017/101086
§ 371 (c)(1),
(2) Date: Jun. 24, 2019

(87) PCT Pub. No.: WO2018/141319
PCT Pub. Date: Aug. 9, 2018

(65) Prior Publication Data
US 2020/0313202 A1  Oct. 1, 2020

(30) Foreign Application Priority Data

Jan. 31, 2017  (DE) ............... 10 2017 101 793.3
Dec. 19, 2017  (DE) ............... 10 2017 130 489.4

(51) Int. Cl.
*H01M 8/0254* (2016.01)
*H01M 8/0206* (2016.01)
*H01M 8/0265* (2016.01)

(52) U.S. Cl.
CPC ....... *H01M 8/0254* (2013.01); *H01M 8/0206* (2013.01); *H01M 8/0265* (2013.01)

(58) Field of Classification Search
CPC .................................................. H01M 8/0254
See application file for complete search history.

(56) References Cited

U.S. PATENT DOCUMENTS

| 9,160,026 B2 | 10/2015 | Futami et al. |
| 2005/0170234 A1 | 8/2005 | Liu et al. |
| 2010/0196799 A1 | 8/2010 | Claude et al. |
| 2013/0149633 A1 | 6/2013 | Jeong |
| 2014/0045097 A1 | 2/2014 | Min et al. |
| 2014/0060666 A1* | 3/2014 | Evans ................ H01M 50/60 137/260 |

(Continued)

FOREIGN PATENT DOCUMENTS

| CN | 10133538 A | 12/2008 |
| CN | 103151531 A | 6/2013 |

(Continued)

*Primary Examiner* — Brian R Ohara
(74) *Attorney, Agent, or Firm* — Reid A. Baldwin

(57) ABSTRACT

A bipolar plate for a fuel cell includes a corrugated plate and a second plate, which is arranged on the corrugated plate in a sealing manner. The corrugated plate has a wave pattern of ascending and descending waves. The corrugated plate has a hole pattern with between one and three parallel rows arranged to for the passage of a gas substantially transversely to the wave shape. Hole sizes and shaped in these three rows are selected in specified relationships to optimize the fuel cell performance.

15 Claims, 4 Drawing Sheets

(56) References Cited

U.S. PATENT DOCUMENTS

| | | | | |
|---|---|---|---|---|
| 2016/0181625 A1* | 6/2016 | Yang | ................... | H01M 8/026 |
| | | | | 429/514 |
| 2017/0358804 A1 | 12/2017 | Jin et al. | | |
| 2018/0175406 A1* | 6/2018 | Kong | ................. | H01M 8/0265 |

FOREIGN PATENT DOCUMENTS

| | | | |
|---|---|---|---|
| CN | 103165920 | A | 6/2013 |
| CN | 103875106 | A | 6/2014 |
| CN | 104157895 | A | 11/2014 |
| CN | 104253280 | A | 12/2014 |
| CN | 105226304 | A | 1/2016 |
| CN | 106207216 | A | 12/2016 |
| DE | 102007009905 | A1 | 9/2007 |
| DE | 112009001377 | T5 | 5/2011 |
| DE | 102012209851 | A1 | 6/2013 |
| DE | 102014223735 | A1 | 12/2015 |
| DE | 102014224025 | A1 | 12/2015 |
| DE | 112009004658 | B4 | 5/2016 |
| DE | 102015207397 | A1 | 6/2016 |
| EP | 2352193 | A1 | 8/2011 |
| JP | 61-216257 | A | 9/1986 |
| JP | H04322062 | A | 11/1992 |
| JP | 2003282098 | A | 10/2003 |
| JP | 2005-340179 | A | 12/2005 |
| JP | 2012124019 | A | 6/2012 |
| JP | 2013-125744 | A | 6/2013 |
| JP | 2016-004778 | A | 1/2016 |
| KR | 20140020629 | A | 2/2014 |
| KR | 20170003275 | A | 1/2017 |
| KR | 20170035880 | A | 3/2017 |

\* cited by examiner

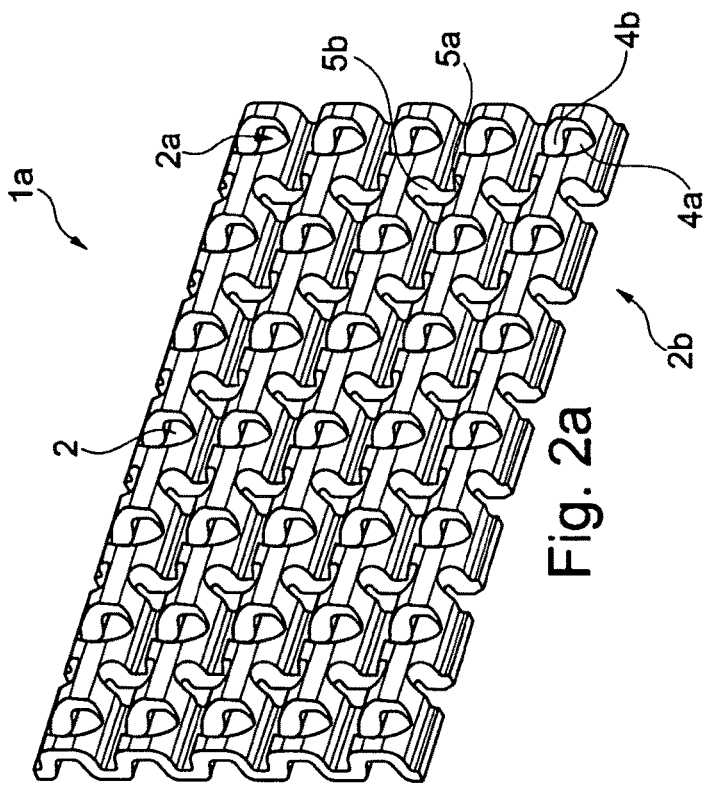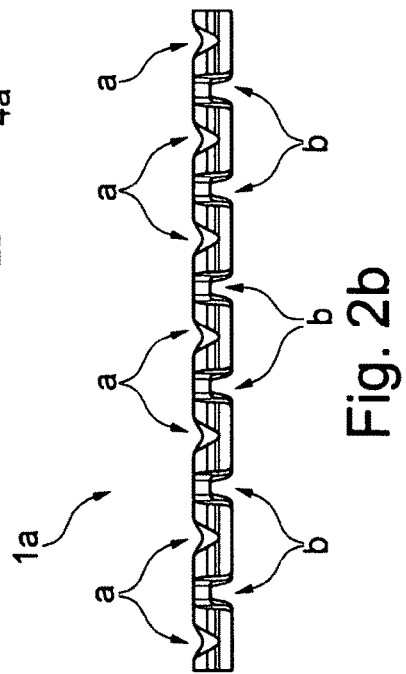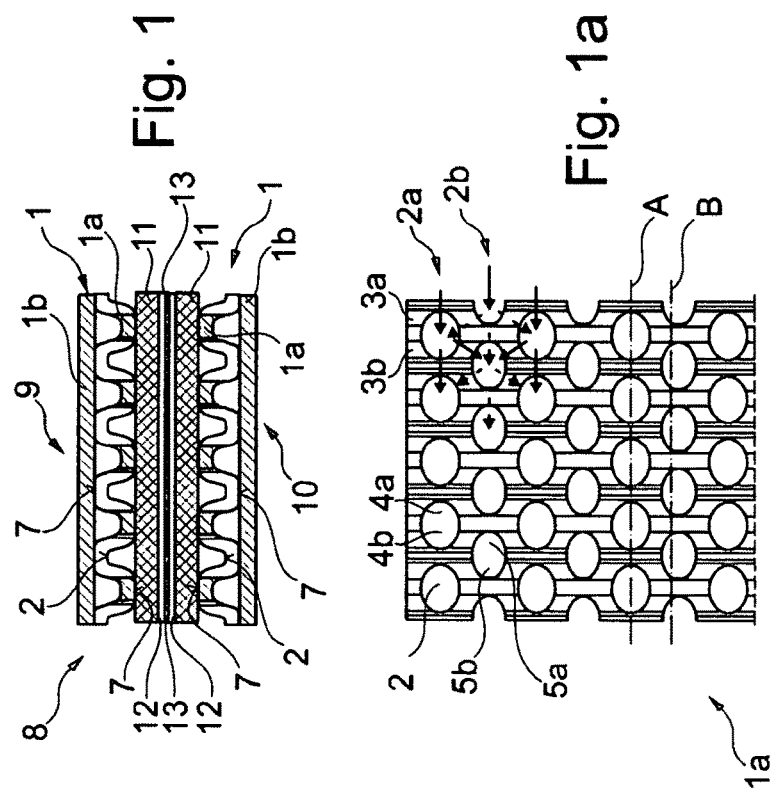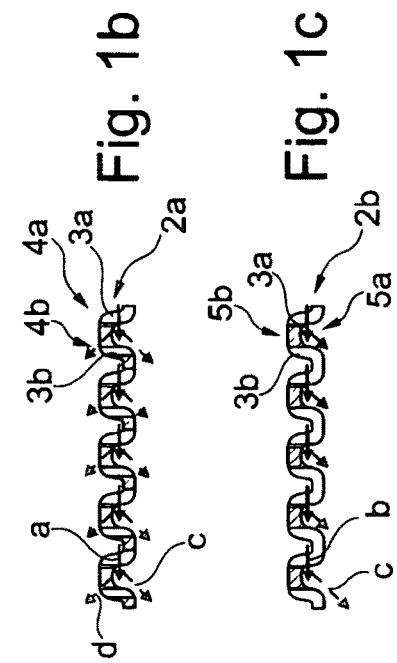

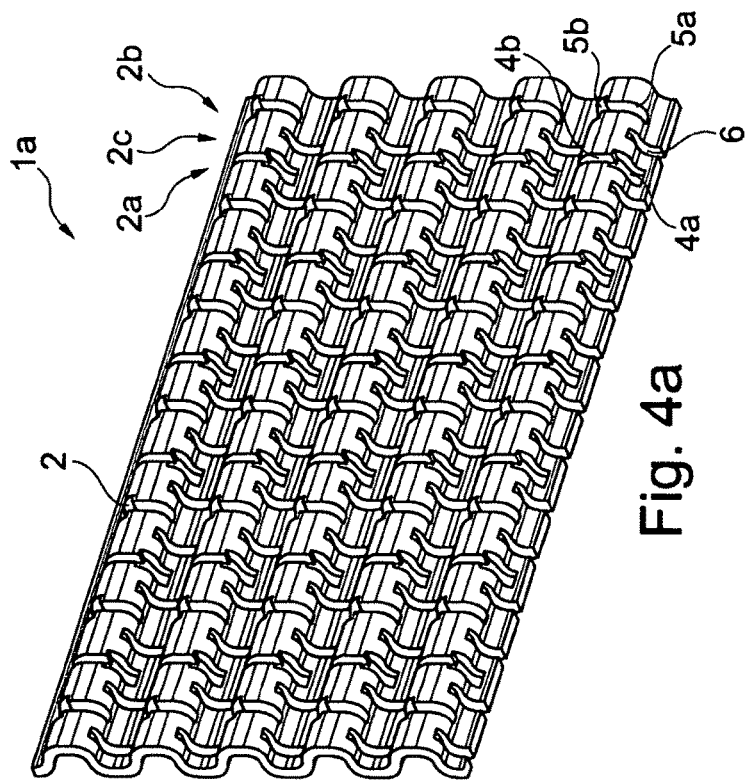
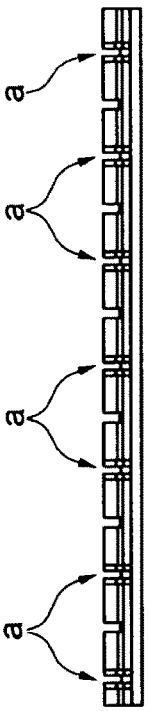
Fig. 4a
Fig. 4b
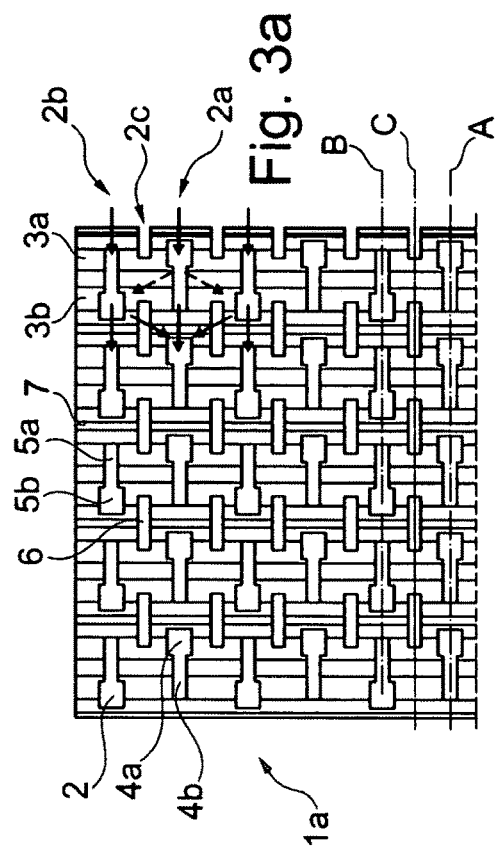
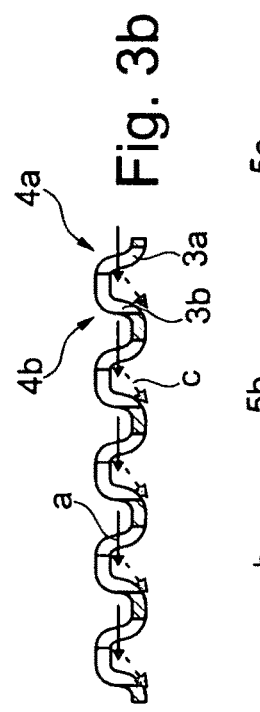
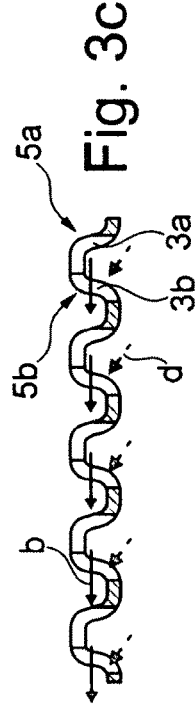
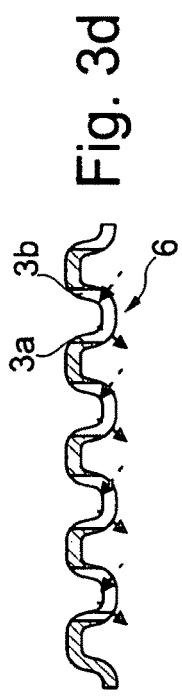
Fig. 3a
Fig. 3b
Fig. 3c
Fig. 3d

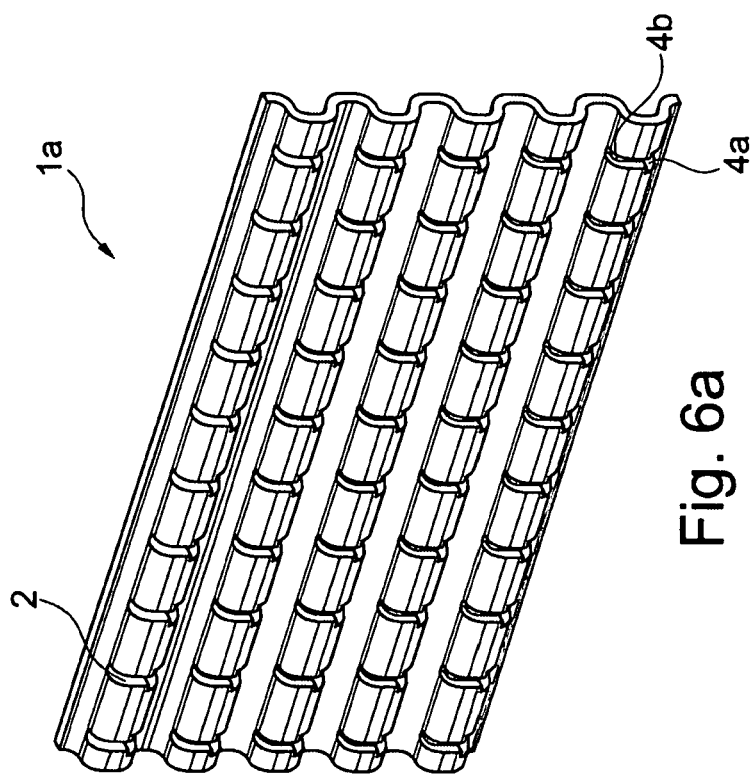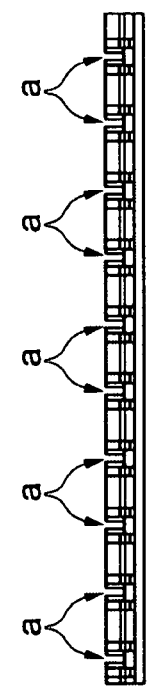
Fig. 6a
Fig. 6b
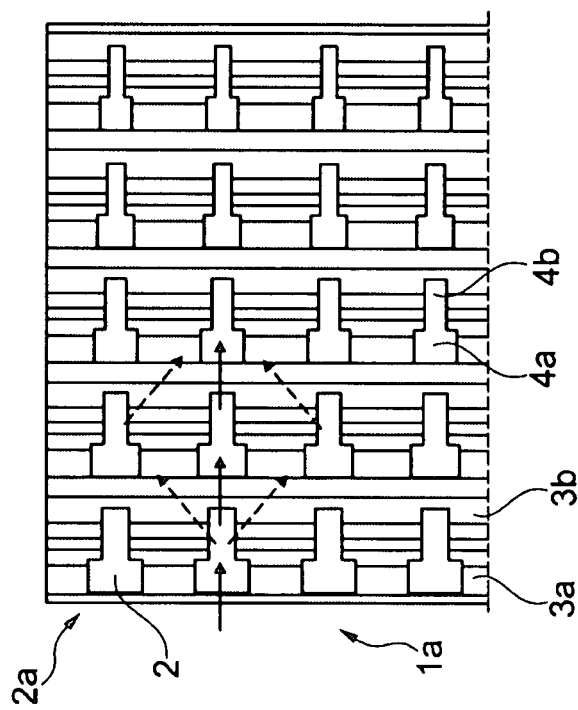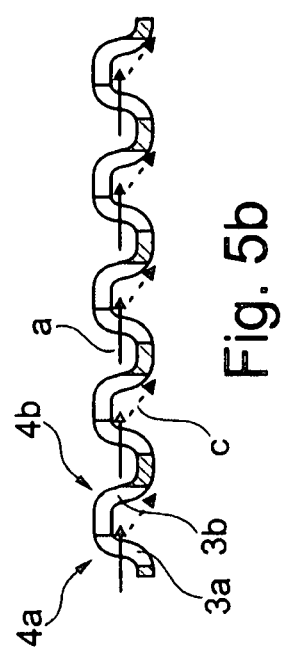
Fig. 5a
Fig. 5b

BIPOLAR PLATE WITH IMPROVED FLOW DISTRIBUTION FOR A FUEL CELL

CROSS-REFERENCE TO RELATED APPLICATIONS

This application is the U.S. National Phase of PCT Appln. No. PCT/DE2017/101086 filed Dec. 20, 2017, which claims priority to DE 10 2017 101 793.3 filed Jan. 31, 2017 and to DE 10 2017 130 489.4 filed Dec. 19, 2017, the entire disclosures of which are incorporated by reference herein.

TECHNICAL FIELD

The disclosure relates to a bipolar plate for a fuel cell.

BACKGROUND

The bipolar plate is a significant part of a polymer electrolyte membrane fuel cell and connects individual cells in series to form a fuel cell stack. Here, a cell comprises a bipolar plate, a gas diffusion layer and a catalyst layer on both the cathode and the anode side, these being electrically separated by a membrane. The bipolar plate has a gas distribution field on both the anode side and the cathode side, and these can be of different or identical shape. The function of the gas distribution fields is to distribute the gases uniformly, thus ensuring homogeneous distribution in the catalyst layer. In the catalyst layer, the reaction takes place with the participation of the reaction gases. In the catalyst layer of the cathode, water is formed during this process and also occurs in liquid form because the temperature is below 100° C. The membrane is water-permeable, and therefore liquid water can occur both on the cathode side and on the anode side. In addition to supplying the gas, the function of the bipolar plate is also to discharge the water which forms from the cell. In addition, good electric and thermal conduction must be ensured.

DE 10 2007 009 905 A1 discloses a fuel cell which is formed by stacking a membrane electrode arrangement and a bipolar plate in a horizontal stacking direction. The membrane electrode arrangement contains a pair of electrodes and an electrolyte membrane arranged between electrodes. Furthermore, the bipolar plate has a rectangular shape, the long sides of which extend in the direction of gravity and the short sides of which extend horizontally in a direction orthogonal to the stacking direction, wherein the bipolar plate has a gas distribution field in order to guide one of the reaction gases in the direction of gravity along an electrode surface, wherein the gas distribution field contains a distribution field in an upper position at the gas inlet and a distribution field in a lower position at the gas outlet. A reaction gas feed channel for feeding one of the reaction gases into the gas distribution field and a reaction gas discharge channel for discharging one of the reaction gases from the gas distribution field extend through the bipolar plate in the stacking direction. The reaction gas discharge channel is arranged below the distribution field at the gas outlet, and at least the distribution field at the gas outlet slopes toward the reaction gas discharge channel. Thus, on the one hand, channels through which the reaction gases flow are formed and, on the other hand, webs are formed which make contact electrically and thermally with the gas diffusion layer and hence with the catalyst layer. Normally, colder regions with poorer through flow are formed below the webs, and these lead to accumulations of water in these regions under damp operating conditions. This generally leads to poor performance by the fuel cell.

Moreover, DE 10 2015 207 397 A1 discloses a porous channel structure for a fuel cell. The channel structure comprises a channel plate having a plurality of web parts, which touch a gas diffusion layer in order to form an undulating cross-section in the flow direction of the gas, and a plurality of channel parts, which touch a level plate in order to produce water-tightness, and a channel opening, through which reaction gas flows. The channel opening is punched in such a way that it contains a section of at least either one web part of the plurality of web parts or one channel part of the plurality of channel parts. Thus the flow through the channel plate is not along the resulting channels, as in DE 10 2007 009 905 A1, but perpendicularly thereto. This is achieved by virtue of the fact that holes are present in a regular pattern, forming channels in the perpendicular direction. In this case, two different flow paths are formed. One flow path between the smooth plate and the perforated plate and one flow path between the perforated plate and the gas diffusion layer. The pattern results in cross flows between the first and the second row of the pattern, resulting in better flow through the resulting web regions and enabling better discharge of the water.

SUMMARY

It is the object of the present disclosure to develop a bipolar plate for a fuel cell, wherein, in particular, the intention is to improve the gas flow through the bipolar plate. The intention is also to increase the power density of the overall fuel cell.

The bipolar plate according to the disclosure for a fuel cell comprises a corrugated plate with a hole pattern, consisting of at least one first row of holes, and a second plate, which is arranged on the corrugated plate in a sealing manner, wherein the corrugated plate is made from a metal sheet and has a regular wave shape of rising and falling waves, wherein, furthermore, the hole pattern is provided for the passage of a gas substantially transversely to the wave shape, wherein the at least one first row of holes has a respective first cross-sectional opening in a respective rising wave in the flow direction of the gas, said cross-sectional opening being larger than a respective second cross-sectional opening of the at least one first row of holes in a respective falling wave.

The hole pattern is provided for the passage of a gas substantially transversely to the wave shape, wherein here "substantially transversely" should be understood to mean that the gas flows toward the corrugated plate in an incident flow direction perpendicular to an edge of the corrugated plate when viewed in plan view, and, having arrived in the region of a hole of the hole pattern, flows toward this hole and is passed along in an angular range of −45° to +45°, starting from a line extending perpendicularly to the respective wave vertex in the plan view of the corrugated plate.

A row of holes should be understood to mean an arrangement of apertures or holes which are arranged in a row with respect to one another. A cross-sectional opening should furthermore be understood to mean an aperture in the corrugated plate. In other words, the corrugated plate has a perforation, wherein the perforation preferably has a plurality of adjacent rows of holes. Each row of holes comprises a plurality of cross-sectional openings, wherein a respective first cross-sectional opening and a respective second cross-sectional opening are arranged alternately in succession in the flow direction. The respective first and second cross-sectional openings are advantageously connected to one another and thereby form a common aperture. The cross-sectional openings are provided for the passage of a gas, in particular for the passage of a combustion gas or of an oxidizing agent. Consequently, the bipolar plate can also be operated both with combustion gas on the anode side and with the oxidizing agent on the cathode side. The second plate comes to rest on the corrugated plate in a sealing manner and in this way forms flow paths for the respective gas transversely to the wave shape. In particular, a multiplicity of rows of holes is arranged adjacent to one another.

In the plan view of a corrugated plate, a row of holes extends, in particular, perpendicularly to the vertices of the waves. However, a deviation of the path of a row of holes from this perpendicular direction of up to $\alpha=\pm 45°$ is also advantageous. Here, the alignment of the rows of holes has a decisive influence on the direction of flow of the inflowing gas with respect to the next wave element.

Owing to the reduction in the respective second cross-sectional opening relative to the respective first cross-sectional opening, a first portion of the gas flow is directed to a gas diffusion layer and thus to the catalyst by the wave shape of the corrugated plate. In contrast, a second portion of the gas flow is directed to the next wave shape by the respective second cross-sectional opening. This brings about both better mixing of the gas diffusion layer and of the catalyst layer with reaction gas and improved water discharge of the water from the gas diffusion layer and the catalyst layer in the direction of the gas distribution field. More uniform current density distribution and improved performance overall is thereby achieved.

According to a preferred embodiment, the hole pattern has at least one second row of holes, which is formed parallel to the first row of holes and transversely to the wave shape. In particular, a multiplicity of alternating first and second rows of holes is arranged adjacent to one another.

The at least one second row of holes preferably has a respective first cross-sectional opening in a respective rising wave in the flow direction of the gas, said cross-sectional opening being smaller or larger than a respective second cross-sectional opening of the at least one second row of holes in a respective falling wave. The respective first and second cross-sectional openings are advantageously connected to one another and thereby form a common aperture. In this case, the pressure conditions ensure that some of the gas is directed from the narrowing cross-sectional opening to the widening cross-sectional opening and therefore the cross flows ensure additional gas mixing in the gas diffusion layer and hence in the catalyst layer in this region.

According to another preferred embodiment, the hole pattern has at least one third row of holes, which is formed parallel to the first row of holes and transversely to the wave shape. In particular, a multiplicity of alternating first, second and third rows of holes is arranged adjacent to one another.

The at least one third row of holes preferably has a constant cross-sectional opening in a respective rising and a respective falling wave in the flow direction of the gas. Consequently, the cross-sectional opening in a respective rising wave is identical to the cross-sectional opening in a respective falling wave. The respective first and second cross-sectional openings are advantageously connected to one another and thereby form a common aperture.

The constant cross-sectional opening of the at least one third row of holes is preferably smaller than the respective larger cross-sectional opening of the at least one first and/or second row of holes. As a result, the flow through the gas diffusion layer is further increased by additional cross flows in a web region.

The disclosure includes the technical teaching that the respective cross-sectional opening can be produced by punching the corrugated plate, wherein the shape of the respective cross-sectional opening is of at least partially oval and/or angular design. As an alternative, the respective cross-sectional opening can also be introduced into the corrugated plate in some other way, in particular by laser cutting. It is likewise possible for a level plate first of all to be punched and then for said plate to be converted to the corrugated plate by forming. Furthermore, the shape can have an oval or beveled oval form, a triangular form or a rectangular form or a form consisting of at least two rectangles of different sizes. It is likewise possible for the shape to be a polygon.

As a further preference, all the cross-sectional openings are reduced successively in the same ratio in the flow direction of the gas. In particular, the width of a respective cross-sectional opening decreases successively in the same ratio in the flow direction of the gas. In other words, all the cross-sectional openings situated in a row become smaller and smaller in the flow direction of the gas, thereby ensuring a decrease in the flow rate downstream. In particular, all the cross-sectional openings are reduced successively in the same ratio in the flow direction of the gas in such a way that the reduction in the speed of flow that would otherwise be caused by the depletion of the reaction gas is held at a constant level. As a result, more uniform gas mixing and better water discharge is ensured in the downstream part of the distribution field.

The second plate is preferably of level or corrugated design and comes to rest at least partially on sections, in particular plane vertex sections, of the wave shape of the corrugated plate, which lie in a plane or in a respective plane. A level plate should be understood to mean a macroscopically smooth plate without corrugations, dents or recesses. In contrast, the corrugated design of the second plate is distinguished by a regular wave shape of rising and falling waves. The waves of the second plate are formed parallel to the waves of the corrugated plate. The wave shape of the second plate can differ in the wave shape, wave height and wave length from the wave shape of the first plate. This results in additional gas flows between the corrugated plate and the second plate in the direction of the gas diffusion layer and hence in the direction of the catalyst layer. Those sections on the corrugated plate against which the second plate comes to rest offer a sufficiently large bearing surface overall for the second plate on the corrugated plate for sufficiently good electric contact.

The disclosure furthermore relates to a fuel cell having at least one such bipolar plate. The fuel cell comprises a multiplicity of cells, wherein the respective cell comprises a bipolar plate, a gas diffusion layer and a catalyst layer on both the cathode and the anode side, these being electrically separated by a membrane.

BRIEF DESCRIPTION OF THE DRAWINGS

Further measures that improve the disclosure are illustrated in greater detail below, together with the description of preferred embodiment examples of the disclosure, by means of the figures, wherein identical or similar elements are provided with the same reference signs. In the drawing:

FIG. 1 shows a schematic view of one of many cells of a fuel cell, wherein the cell has two bipolar plates, FIG. 1a shows a schematic plan view of a corrugated plate of a bipolar plate according to a first embodiment example, FIG. 1b shows a schematic section through a first row of holes of the corrugated plate according to FIG. 1a, FIG. 1c shows a schematic section through a second row of holes of the corrugated plate according to FIG. 1a, FIG. 2a shows a schematic perspective illustration of the corrugated plate according to FIG. 1a, FIG. 2b shows a schematic front view in the flow direction of a gas through the corrugated plate according to FIG. 2a, FIG. 3a shows a schematic plan view of a corrugated plate of a bipolar plate according to a second embodiment example, FIG. 3b shows a schematic section through a first row of holes of the corrugated plate according to FIG. 3a, FIG. 3c shows a schematic section through a second row of holes of the corrugated plate according to FIG. 3a, FIG. 3d shows a schematic section through a third row of holes of the corrugated plate according to FIG. 3a, FIG. 4a shows a schematic perspective illustration of the corrugated plate according to FIG. 3a, FIG. 4b shows a schematic front view in the flow direction of a gas through the corrugated plate according to FIG. 4a, FIG. 5a shows a schematic plan view of a corrugated plate of a bipolar plate according to a third embodiment example, FIG. 5b shows a schematic section through a row of holes of the corrugated plate according to FIG. 5a, FIG. 6a shows a schematic perspective illustration of the corrugated plate according to FIG. 5a, FIG. 6b shows a schematic front view in the flow direction of a gas through the corrugated plate according to FIG. 6a, FIG. 7a shows a plan view of another corrugated plate.

DETAILED DESCRIPTION

Figure 7B:
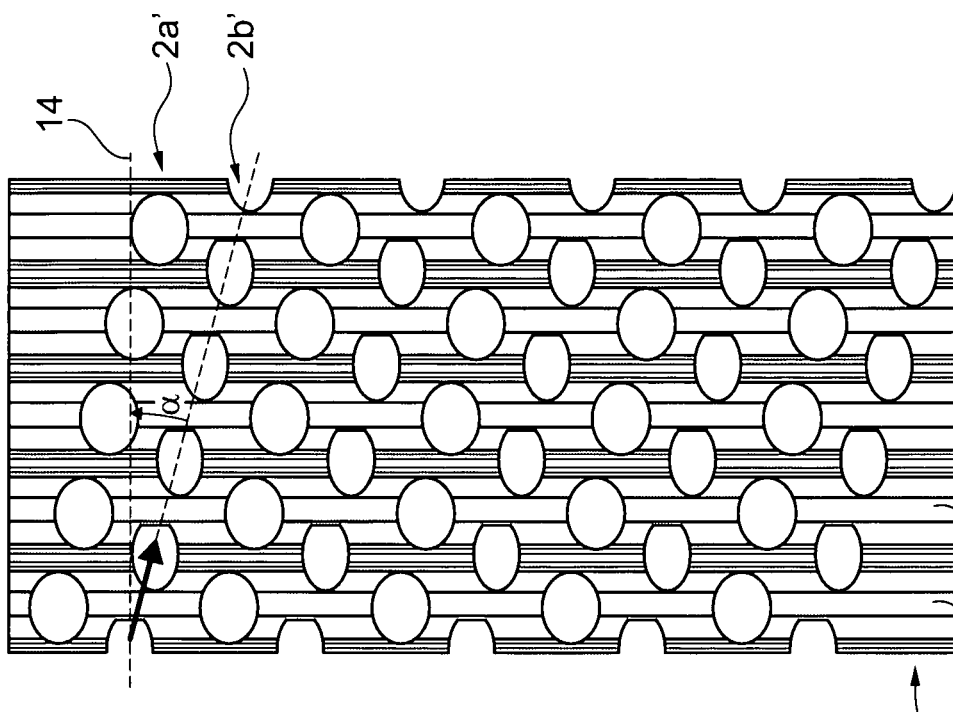
FIG. 7b shows a plan view of yet another corrugated plate.

According to FIG. 1, a cell 8 of a fuel cell—not illustrated here—has a bipolar plate 1 both on the anode side 9 and on the cathode side 10, said plate comprising a corrugated plate 1a with a hole pattern 2 and a second plate 1b, which is arranged on the corrugated plate 1a in a sealing manner, a respective gas diffusion layer 11 and a respective catalyst layer 12. The two catalyst layers 12 are separated electrically from one another by a membrane 13. The hole pattern 2 on the respective bipolar plate 1 is provided for the passage of a combustion gas on the anode side 9 and for the passage of an oxidizing agent on the cathode side 10. By means of the bipolar plates 1 according to the disclosure, homogeneous distribution of the respective gas in the respective catalyst layer 12 is achieved. In the present case, the respective second plate 1b is of level design and comes to rest at least partially against flat vertex sections 7 of the wave shape of the corrugated plate 1a, which lie in one plane. On the respective opposite side of the corrugated plate 1a, the respective gas diffusion layer 11 comes to rest against flat vertex sections 7 of the wave shape of the corrugated plate 1a, which lie in one plane.

FIG. 1a shows a corrugated plate 1a of a bipolar plate 1 having a hole pattern 2 consisting of first and second rows of holes 2a, 2b, which are arranged alternately adjacent to one another. For the sake of simplification, the second plate 1b of the bi-polar plate 1 has not been depicted in the present case and in the following illustrations. The corrugated plate 1a is formed from a metal sheet and has a regular wave shape of rising and falling waves 3a, 3b. The rows of holes 2a, 2b of the hole pattern 2 are provided for the passage of a gas (see horizontal arrows at the right-hand edge of the corrugated plate 1a) and formed substantially transversely to the wave shape. In this case, the gas impinges upon the corrugated plate 1a in the incident flow direction from right to left in the plane of the paper here. Thus, when viewed in the plan view, the gas impinges upon the corrugated plate 1a in an incident flow direction perpendicular to the wave vertices of the waves 3a, 3b. Having arrived in the region of a hole of the hole pattern, the gas flows toward this hole and is passed along in an angular range of −45° to +45°, starting from a line extending perpendicularly to the respective wave vertex in the plan view of the corrugated plate 1a.

According to FIG. 1b, which shows a section through the first row of holes 2a shown in FIG. 1a along a section line A, the respective first cross-sectional openings 4a in a respective rising wave 3a are larger than the respective second cross-sectional openings 4b in a respective falling wave 3b in the flow direction of the gas.

According to FIG. 1c, which shows a section through the second row of holes 2b shown in FIG. 1a along a section line B, the respective first cross-sectional openings 5a in a respective rising wave 3a are larger than the respective second cross-sectional openings 5b in a respective falling wave 3b in the flow direction of the gas.

As illustrated in FIG. 1b, a first gas flow path is situated between the corrugated plate 1a and the second plate 1b, which comes to rest on one side. As illustrated in FIG. 1c, a second gas flow path b is situated between the corrugated plate 1a and the gas diffusion layer, which comes to rest on the other side. By virtue of the fact that the respective first cross-sectional openings 4a, 5a in a respective rising wave 3a are larger than the respective second cross-sectional openings 4b, 5b in a respective falling wave 3b in the flow direction of the gas, there is in each case a gas flow in the direction of the gas diffusion layer, which is illustrated by the oblique arrows c, d in FIGS. 1b and 1c.

In addition, there are flows in the wave channels transversely thereto owing to the decreasing cross-sectional openings 4b, 5b. Here, the flows form both in the wave channels adjoining the second plate 1b, this being illustrated by means of the oblique arrows in solid lines in FIG. 1a, and in the wave channels adjoining the gas diffusion layer, this being illustrated by means of the oblique arrows in dashed lines in FIG. 1a. As a result, on the one hand, improved gas mixing in the gas diffusion layer is produced in this region and, on the other hand, water discharge from the gas diffusion layer is improved.

FIG. 2a shows a perspective illustration of the corrugated plate 1a according to FIG. 1a. The wave shape of the corrugated plate 1a is particularly clear from FIG. 2a. The hole pattern 2 is formed in the wave shape in such a way that the cross-sectional openings 4a, 4b of the respective first row of holes 2a are positioned on one side of the corrugated plate 1a and the cross-sectional openings 5a, 5b of the respective second row of holes 2b are positioned on another side of the corrugated plate 1a. This results in two different, repeated gas channels which are arranged transversely to the wave shape of the corrugated plate 1a. The hole pattern 2 was produced by punching the corrugated plate 1a. The corrugated plate 1a can be formed either before or after punching. The shape of the respective cross-sectional opening 4a, 4b, 5a, 5b is of at least partially oval design.

FIG. 2b shows a front view of the corrugated plate 1a illustrated in FIG. 2a in the flow direction of a gas. The two gas flow paths a, b are particularly clear from this view and are formed alternately adjacent to one another, transversely to the wave shape.

FIG. 3a shows another embodiment of a corrugated plate 1a of a bipolar plate 1 having a hole pattern 2 consisting of first, second and third rows of holes 2a, 2b, 2c which are arranged alternately adjacent to one another. For the sake of simplification, the second plate 1b of the bipolar plate 1 has not been depicted in the present case and in the following illustrations. The corrugated plate 1a is formed from a metal sheet and has a regular wave shape of rising and falling waves 3a, 3b. The rows of holes 2a, 2b, 2c of the hole pattern 2 are provided for the passage of a gas and formed substantially transversely to the wave shape.

According to FIG. 3b, which shows a section through the first row of holes 2a shown in FIG. 3a along a section line A, the respective first cross-sectional openings 4a in a respective rising wave 3a are larger than the respective second cross-sectional openings 4b in a respective falling wave 3b in the flow direction of the gas.

According to FIG. 3c, which shows a section through the second row of holes 2b shown in FIG. 3a along a section line B, the respective first cross-sectional openings 5a in a respective rising wave 3a are smaller than the respective second cross-sectional openings 5b in a respective falling wave 3b in the flow direction of the gas.

According to FIG. 3d, which illustrates a section along section line C passing through the third row of holes 2c shown in FIG. 3a, the respective cross-sectional openings 6 are constant in the flow direction of the gas.

As illustrated in FIGS. 3b and 3c, a gas flow path a is situated between the corrugated plate 1a and the second plate 1b, which comes to rest on one side. As shown in FIG. 3b, the respective cross-sectional openings 4a, 4b of the first row of holes 2a bring about an additional gas flow path c in the direction of the gas diffusion layer. As shown in FIG. 3c, the respective cross-sectional openings 5a, 5b of the second row of holes 2b furthermore bring about an additional gas flow path d out of the gas diffusion layer. The first and second rows of holes 2a, 2b are arranged offset with respect to one another in the flow direction and thereby enable the gas additionally to flow transversely along the wave shape. This is illustrated in FIG. 3a by the oblique arrows in dashed lines. Gas mixing in the gas diffusion layer is thereby improved in this region. The cross-sectional openings 6 of the third row of holes 2c are smaller than the respective larger cross-sectional openings 4a, 5b of the first and second rows of holes 2a, 2b. The third row of holes 2c is arranged on the flat vertex sections 7 of the corrugated plate 1a, in the direction of the gas diffusion layer. This results in additional underflows in this region, which both increase the gas mixing in the gas diffusion layer and also promote water discharge from the gas diffusion layer. In FIG. 3d, the additional gas flow paths are illustrated by means of the dashed arrows.

FIG. 4a shows a perspective illustration of the corrugated plate 1a according to FIG. 3a. The wave shape of the corrugated plate 1a is particularly clear from FIG. 4a. The hole pattern 2 is formed in the wave shape in such a way that the cross-sectional openings 4a, 4b, 5a, 5b of the respective first and second row of holes 2a, 2b are positioned on one side of the corrugated plate 1a and the cross-sectional openings 6 of the respective third row of holes 2c are positioned on another side of the corrugated plate 1a. The hole pattern 2 was produced by punching the corrugated plate 1a. The shape of the cross-sectional openings 4a, 4b, 5a, 5b of the first and second rows of holes 2a, 2b is made up of two rectangles, wherein the shape of the cross-sectional openings 6 of the third row of holes 2c is formed by a rectangle.

FIG. 4b shows a front view of the corrugated plate 1a illustrated in FIG. 2a in the flow direction of a gas. The gas flow path a is particularly clear from this view.

FIG. 5a shows a corrugated plate 1a of a bipolar plate 1 with a hole pattern 2, consisting of a plurality of rows of holes 2a of identical design, which are formed transversely to a regular wave shape of rising and falling waves 3a, 3b. For the sake of simplification, the second plate 1b of the bipolar plate 1 has not been depicted in the present case and in the following illustrations. The corrugated plate 1a is formed from a metal sheet. The hole pattern 2 is provided for the passage of a gas. All the cross-sectional openings 4a, 4b of the respective row of holes 2a are reduced successively in the same ratio in the flow direction of the gas. In this process, the width of the cross-sectional openings 4a, 4b is reduced. The consumption of reactants at the catalyst layer is thereby taken into account, in particular. In order to keep the speed of flow from the inlet to the outlet of the bipolar plate 1 approximately constant, the cross-sectional openings 4a, 4b introduced into the wave shape are reduced in size in accordance with the resulting reduction in the gas flow. By means of this adaptation, the reduction in the speed of flow through the reactive consumption of the reaction gas is counteracted. Consequently, the pressure loss increases over the length of flow.

According to FIG. 5b, which shows a section along the row of holes 2a shown in FIG. 5a, the respective first cross-sectional openings 4a in a respective rising wave 3a are larger than the respective second cross-sectional openings 4b in a respective falling wave 3b in the flow direction of the gas. As illustrated in FIG. 5b, a gas flow path a is situated between the corrugated plate 1a and the second plate 1b, which comes to rest on one side. As shown in FIG. 5b, the respective cross-sectional openings 4a, 4b bring about an additional gas flow path in the direction of the gas diffusion layer. In FIG. 5b, the additional gas flow path is illustrated by means of the dashed arrow c.

FIG. 6a shows a perspective illustration of the corrugated plate 1a according to FIG. 5a. The wave shape of the corrugated plate 1a is particularly clear from FIG. 6a. The hole pattern 2 is formed in the wave shape in such a way that all the cross-sectional openings 4a, 4b are positioned on one side of the corrugated plate 1a. The hole pattern 2 is produced by punching the corrugated plate 1a. The shape of the cross-sectional openings 4a, 4b is made up of two rectangles.

FIG. 6b shows a front view of the corrugated plate 1a illustrated in FIG. 6a in the flow direction of the gas. The gas flow path a is particularly clear from this view.

Figure 7A:
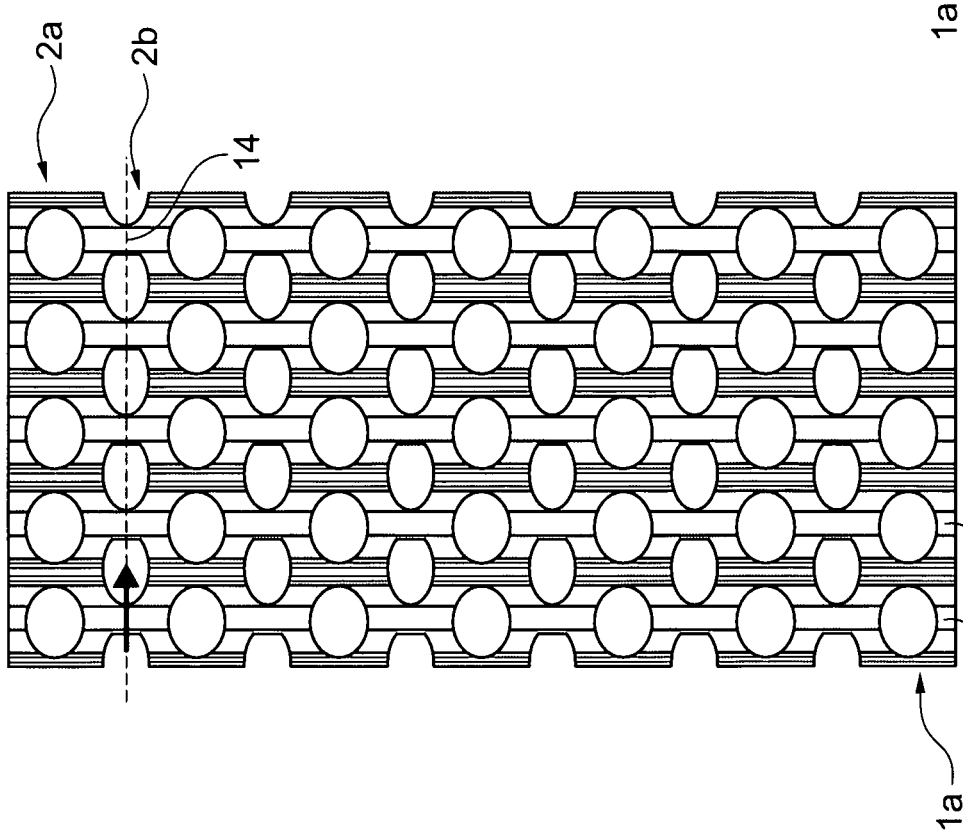

FIG. 7a shows a plan view of a corrugated plate 1a, in which there is a plurality of rows of holes 2a, 2b. The gas flows toward the corrugated plate 1a in an incident flow direction, which follows a line 14 aligned perpendicularly to the wave vertices 30. In the region of each hole, the gas is distributed over an angular range of −45° to +45°.

FIG. 7b shows a plan view of a corrugated plate 1a, in which each row of holes 2a', 2b' extends at an angle α of 45° to the line 14 aligned perpendicularly to the wave vertices 30. The gas flows toward the corrugated plate 1a, following the line 14, and is once again distributed at each hole.

The disclosure is not restricted to the embodiment examples described above. As an alternative, the second plate 1b in FIG. 1 can also be of corrugated design. Moreover, the cross-sectional openings 4a, 4b, 5a, 5b, 6 can also have different shapes. It is likewise possible for the hole pattern 2 to have further rows of holes and/or for these rows to be at different angles α.

LIST OF REFERENCE SIGNS 1 bipolar plate
1a corrugated plate
1b second plate
2 hole pattern
2a, 2a' first row of holes
2b, 2b' second row of holes
2c third row of holes
3a rising wave
3b falling wave
4a first cross-sectional opening
4b second cross-sectional opening
5a first cross-sectional opening
5b second cross-sectional opening
6 constant cross-sectional opening
7 flat vertex section
8 cell
9 anode side
10 cathode side
11 gas diffusion layer
12 catalyst layer
13 membrane
14 line
30 wave vertex
A section line along a first row of holes
B section line along a second row of holes
C section line along a third row of holes
α angle
a first gas flow path
b second gas flow path
c, d additional gas flow path

The invention claimed is:

1. A bipolar plate for a fuel cell, comprising a corrugated plate with a hole pattern consisting of at least one first row of holes, and a second plate, which is arranged on the corrugated plate in a sealing manner, wherein the corrugated plate is made from a metal sheet and has a regular wave shape of rising and falling waves, wherein, the hole pattern is provided for the passage of a gas substantially transversely to the wave shape,
wherein the at least one first row of holes has a respective first cross-sectional opening in a respective rising wave in the flow direction of the gas, said first cross-sectional opening being larger than a respective second cross-sectional opening of the at least one first row of holes in a respective falling wave.

2. The bipolar plate of claim 1, wherein the hole pattern has at least one second row of holes, which is formed parallel to the first row of holes and transversely to the wave shape.

3. The bipolar plate of claim 2, wherein the at least one second row of holes has a respective third cross-sectional opening in a respective rising wave in the flow direction of the gas, said third cross-sectional opening being smaller or larger than a respective fourth cross-sectional opening of the at least one second row of holes in a respective falling wave.

4. The bipolar plate of claim 2,
wherein the hole pattern has at least one third row of holes, which is formed parallel to the first row of holes and transversely to the wave shape.

5. The bipolar plate of claim 4, wherein the at least one third row of holes has a constant cross-sectional opening in a respective rising and a respective falling wave in the flow direction of the gas.

6. The bipolar plate of claim 5, wherein the constant cross-sectional opening of the at least one third row of holes is smaller than the respective larger cross-sectional opening of the at least one first or second row of holes.

7. The bipolar plate of claim 1,
wherein the first or second cross-sectional opening is produced by punching the corrugated plate, wherein the shape of the respective cross-sectional opening is of at least partially oval or angular design.

8. The bipolar plate of claim 1,
wherein all the cross-sectional openings are reduced successively in the same ratio in the flow direction of the gas.

9. The bipolar plate of claim 1,
wherein the second plate is of level or corrugated design and comes to rest at least partially on sections, in particular plane vertex sections, of the wave shape of the corrugated plate.

10. A fuel cell having at least one bipolar plate as claimed in claim 1.

11. A bipolar plate for a fuel cell, comprising:
a corrugated plate having a regular wave shape of rising and falling waves and defining a first row of holes for the passage of a gas in a flow direction transverse to the wave shape, the first row of holes having a first cross-sectional area in a rising wave in the flow direction and a second cross-sectional area, less than the first cross sectional area, in a falling wave in the flow direction; and
a second plate, which is arranged on the corrugated plate in a sealing manner.

12. The bipolar plate of claim 11, wherein the corrugated plate defines a second row of holes, parallel to the first row of holes and transversely to the wave shape, the second row of holes having a third cross-sectional area in a rising wave in the flow direction and a fourth cross-sectional area, different than the third cross sectional area, in a falling wave in the flow direction.

13. The bipolar plate of claim 12, wherein the corrugated plate defines a third row of holes, parallel to the first row of holes and transversely to the wave shape, the third row of holes having a fifth cross-sectional area in a rising wave in the flow direction and a sixth cross-sectional area, equal to the fifth cross sectional area, in a falling wave in the flow direction.

14. The bipolar plate of claim 13, wherein the fifth cross-sectional area is less than one of the first through fourth cross-sectional areas.

15. The bipolar plate of claim 11, wherein the holes of the first row of holes are oval shaped.

* * * * *